United States Patent [19]

Albert

[11] Patent Number: 4,541,895

[45] Date of Patent: Sep. 17, 1985

[54] PAPERMAKERS FABRIC OF NONWOVEN LAYERS IN A LAMINATED CONSTRUCTION

[75] Inventor: Hans Albert, Vienna, Austria

[73] Assignee: Scapa Inc., Waycross, Ga.

[21] Appl. No.: 437,548

[22] Filed: Oct. 29, 1982

[51] Int. Cl.[4] .................. B32B 3/10; B32B 5/02; D21F 3/02; D21F 7/08

[52] U.S. Cl. ..................... 162/348; 162/358; 162/DIG. 1; 428/57; 428/131; 428/137; 428/282

[58] Field of Search ............ 428/282, 137, 138, 139, 428/57, 192, 136, 131, 284; 162/DIG. 1, 358, 348, 351

[56] References Cited

U.S. PATENT DOCUMENTS

| | | | |
|---|---|---|---|
| 3,323,226 | 6/1967 | Beaumont et al. | 34/95 |
| 3,594,261 | 7/1971 | Broerman | 161/62 |
| 3,613,258 | 10/1971 | Jamieson | 162/358 |
| 3,695,988 | 10/1972 | Steigerwald | 161/109 |
| 3,719,736 | 3/1973 | Woodruff | 264/156 |
| 4,206,258 | 6/1980 | Balcar | 428/131 |
| 4,279,676 | 7/1981 | Morrison et al. | 428/57 |
| 4,300,982 | 11/1981 | Romanski | 162/358 |
| 4,427,734 | 1/1984 | Johnson | 162/358 |
| 4,446,187 | 5/1984 | Eklund | 162/358 |

FOREIGN PATENT DOCUMENTS

| | | |
|---|---|---|
| 235679 | 9/1964 | Austria . |
| 1295197 | 10/1962 | France . |

OTHER PUBLICATIONS

Paper Machine Felts and Fabrics; Albany International; Binghamton, N.Y.; 1976.

*Primary Examiner*—Steve Alvo
*Attorney, Agent, or Firm*—Fleit, Jacobson, Cohn & Price

[57] ABSTRACT

A papermakers fabric made up of a plurality of impervious nonwoven sheets joined together in a laminated arrangement to define the fabric or belt. Defined throughout the fabric are a series of drainage apertures which are created in the fabric by conventional techniques, such as laser drilling. The size and distribution of the apertures can be varied to provide a given permeability. Small surface apertures are provided to prevent loss of fiber through the fabric. Each of the layers of the papermakers fabric serves a particular purpose. For example, one or more of the layers may be made of an abrasion resistant material. Other layers may be made of materials exhibiting other desirable characteristics such as resistance to heat, acid, flame and static charge, to name a few. Yarns to provide added strength may be placed between the layers or incorporated into one or more of them. A fabric according to the invention may be made self-cleaning by the incorporation of a detergent or other material within or between the layers of the fabric. Operation of the fabric on the papermachine will cause the release of the detergent and will accomplish the cleaning. Materials such as traditional bolt fabric may be incorporated with the laminated fabric in order to obtain the advantages of each. Embossed surface layers can be provided to aid in the control of the belt on the papermachine.

13 Claims, 16 Drawing Figures

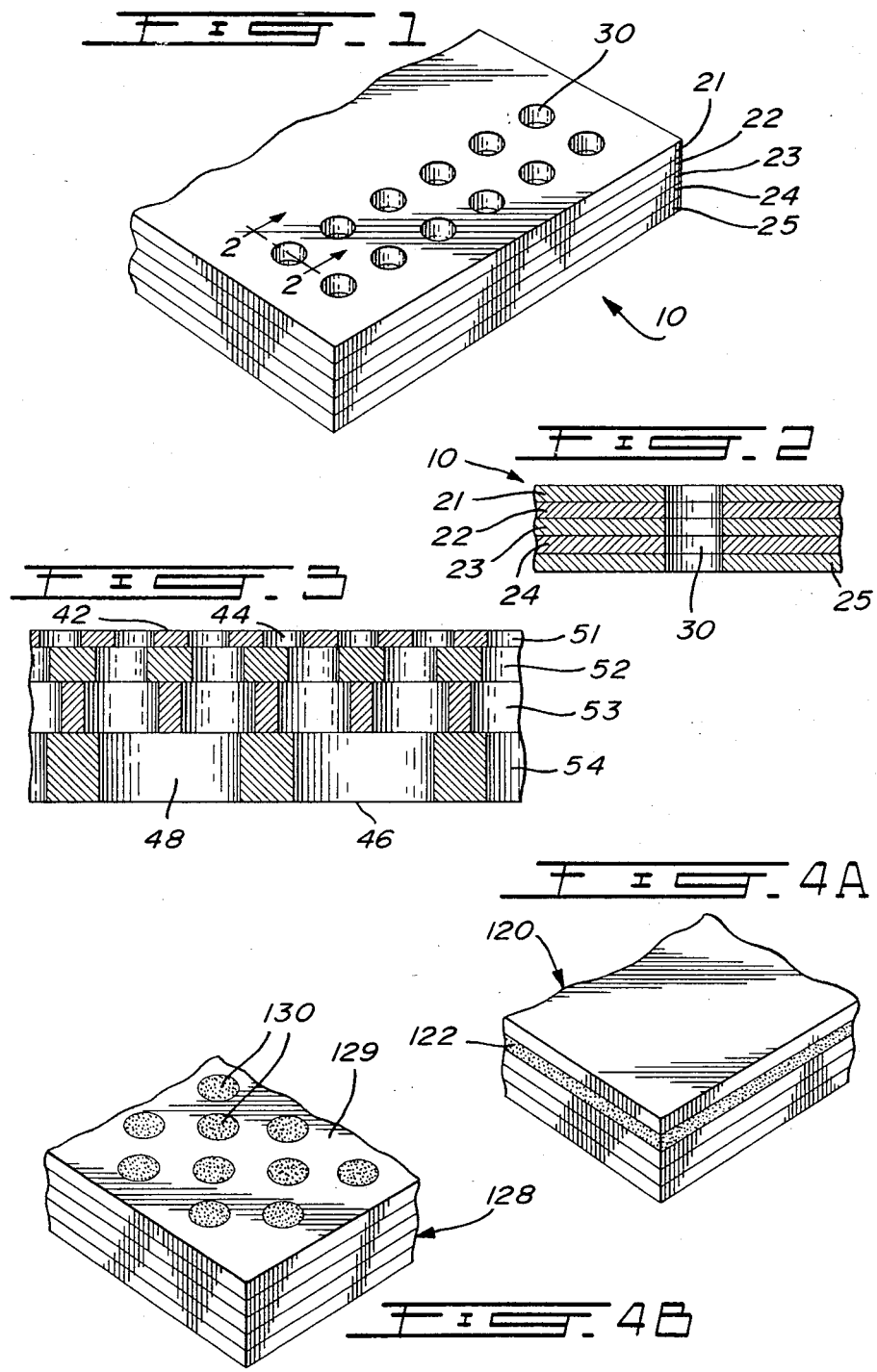

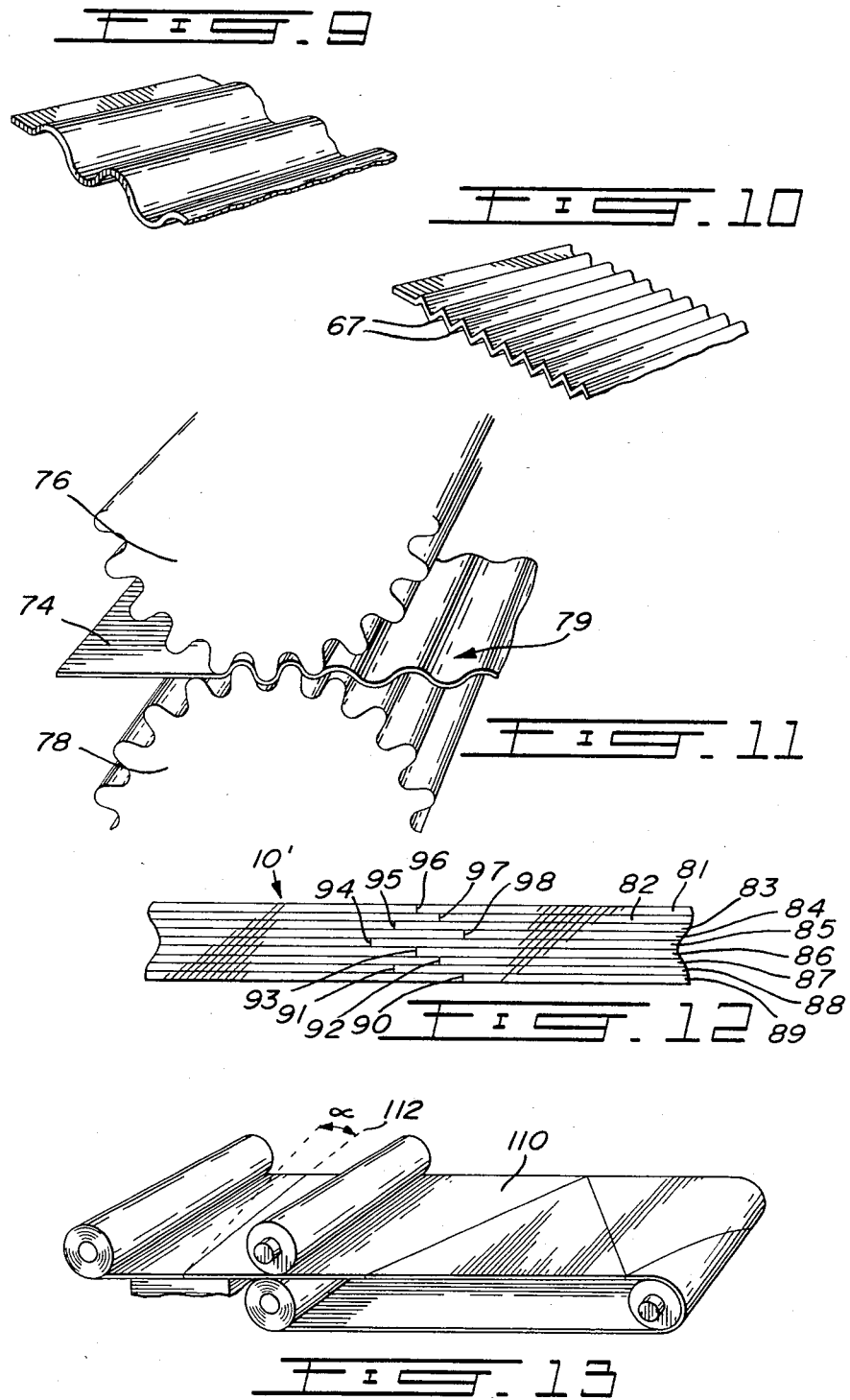

PAPERMAKERS FABRIC OF NONWOVEN LAYERS IN A LAMINATED CONSTRUCTION

BACKGROUND OF THE INVENTION

1. Field of the Invention

The present invention relates to the use of nonwoven layers in a laminated construction to produce a papermakers fabric.

2. Description of the Prior Art

In papermaking machines, a papermakers fabric or belt in the form of an endless belt-like structure is supported on and advanced by various machine rolls during the papermaking process. Papermakers belts carry various names depending on their intended use. By way of example, papermakers belts include forming fabrics, wet press felts, and dryer felts and fabrics, to name just a few.

Forming fabrics, also known as fourdrinier wires, or forming media, are commonly configured from a length of woven fabric with its ends joined together in a seam to provide a endless belt. The fabric may also be constructed by employing an endless weave process, thereby eliminating the seam. Either fabric generally comprises a plurality of machine direction yarns and a plurality of cross machine direction yarns which have been woven together on a suitable loom.

Recently, in the papermaking field, it has been found that synthetic materials may be used, in whole or in part, to produce forming fabrics of superior quality. Today, almost all forming fabrics are made from polyesters such as Dacron or Trevina, acrylic fibers such as Orlon, Dynel and Acrylan, copolymers such as Saran, or polyamides such as Nylon. The warp and weft yarns of the forming fabric may be of the same or different constitute material and/or constructions, and may be in the form of a monofilament or multifilament yarn.

Among the problems prominent in conventionally woven forming fabrics are edge curling and control of fabric permeability without adversely affecting fabric strength and stability. Forming fabrics play the major role in producing a uniform paper product. In order to produce a uniform product, the forming fabric used must have consistent thickness, hole size, and draining properties, and there must be repeatability not only from fabric to fabric, but also within a fabric. Thus, a fabric structure and a construction method which allow repeated production of uniform fabrics are highly desirable. Some forming fabrics are chemically treated, after production, to improve properties such as sheet release, wear, and drainage, to name a few. The ability to manufacture a fabric with improved properties without the need for post-production chemical treatment would be advantageous.

A conventional dryer felt consists of an endless conveyor belt made from a two-or three-plane fabric wherein the various planes are defined by different groups of crossmachine direction yarns. These planes, plys or layers are united by a plurality of machine direction yarns. The yarns used to weave the most up-to-date dryer felts are made from synthetic monofilaments or synthetic multifilaments, formed of materials such as polyester or polyamide.

Because the synthetic materials are quite expensive, manufacturers are continually seeking to improve dryer felts, both in terms of cost and in terms of dryer felt performance and reliability. Along these lines, it is important in certain dryer felts to maintain low liquid permeability. One way of lowering the permeability is to weave more yarn to the inch, but this, of course, adds to the cost of the already expensive felts. Both the felt manufacturer and papermaker would benefit from a dryer felt in which low permeability could be provided at an economical cost.

Many of the prior art papermakers belts employ various types of seams which are joined together through the use of a pintle in order to facilitate insertion and removal of the papermakers belt from the papermaking machine. A very common type of seam is one employing metal clipper hooks arranged in an alternating relationship on either end of the papermakers belt to receive a pintle to join the ends of the belt together. In other papermakers belts, the ends of the belts are joined in an abutting relationship and held that way through the use of clipper hooks inserted in a webbing, the whole of which is attached to the underside of the belt. Such an arrangement has the disadvantage of frequently causing seam marking in the paper sheet being made. Another problem is that bouncing of the papermakers belt occurs when the seam either meets or leaves the contact of a machine roll. This bouncing causes further marking of the paper sheet and, in an extreme case, may cause paper sheet breaks and the rapid weakening of the fabric structure.

Woven papermakers fabrics frequently have variations in thickness over the fabric due to the weaving process. Because of the variation in thickness, wet felts must be produced as endless woven belts since potential differences in thickness of the fabric at the seam could cause bouncing at the press rolls, resulting in unacceptable paper characteristics. A fabric which can be produced with uniform thickness would have the advantage of being able to be spliced on the paper machine to produce an endless fabric without the threat of increased roll bounce. Downtime for fabric changes could be reduced by a fabric which is readily joined on the paper machine. Such a fabric would also reduce the roll bounce associated with irregularities over the length of the fabric, thus allowing production of higher quality paper.

Present woven fabrics often have different compressibility characteristics from one fabric to the next. Uniform compressibility is necessary for correct adjustment of the press roll nip so that there is correct moisture removal without damaging the paper. A fabric in which compressibility could be controlled and uniformly maintained during manufacture would have the advantage of requiring fewer adjustments to the paper machine when fabrics are changed, thus allowing increased production.

The ability to absorb and to give up moisture is an important characteristic for certain fabrics, particularly wet felts. This ability is influenced to a large extent by the capillary structure of the fabric. In the prior art, the choice of yarns and weave design gives some control over capillary structure, but it does not offer precise control. A fabric in which the capillary structure could be established, with a high degree of repeatability, during the manufacturing process, would have significant advantages over the prior art.

A further problem with present woven wet felts is that once a new wet felt is installed, a relatively long break-in time is required before the fabric becomes compacted and stabilized in its moisture removing configuration. There would be a significant advantage to a fabric which was precompacted during manufacture, as this would eliminate the break-in time thereby increasing the productivity of the paper machine.

There is thus a need for a papermakers belt which may function reliably in specific of the various environments encountered during the papermaking process while at the same time being produced inexpensively and efficiently. It is also desirable that the papermakers belt be endless in construction and easily repaired while in its position of intended use. The present invention is directed toward filling those needs.

SUMMARY OF THE INVENTION

The present invention relates to a papermakers fabric which generally comprises a plurality of impervious nonwoven sheets joined together in a laminated arrangement to define the fabric. Defined throughout the fabric are a series of drainage apertures which are created in the fabric by conventional techniques, such as laser drilling.

Each layer of the papermakers fabric is chosen to serve a particular purpose. For example, if the laminated fabric is to be used as a forming fabric, then the layer that contacts the paper slurry is made of a highly abrasion resistant material. The same is true of the layer that contacts the dewatering screen during the initial paper formation process. The remaining layers are chosen to provide the papermakers fabric with desirable characteristics important to its intended use. For example, one of the layers might be a material exhibiting high tensile strength to add strength and rigidly to the fabric. Another layer might be acid resistant. In addition, another layer might be antistatic, to combat a condition which is very prevalent in dryer fabrics. Thus, it can be appreciated that, depending on the intended use, the number of layers and the materials constituting the layers may differ from fabric to fabric.

For certain applications, it is desirable to produce the drainage apertures or holes after the various layers have been laminated together. For other applications, it is desirable to produce apertures for varying sizes in the individual layers and then to laminate the layers together so as to create capillary channels of varying size.

For still other applications, it is desirable to incorporate yarns between the foils.

For wet press felt applications, a basic laminated fabric is incorporated with a traditional batt material secured to the base fabric by glue, resin or similar adhesives.

Through the use of layered materials, it is possible to repair and splice a papermakers fabric while it is in its position of intended use. The destroyed area of the belt may be removed and a ew piece may be inserted by building up the various layers on a corresponding basis through ultrasonic welding.

It is thus a primary object of the present invention to provide an improved papermakers belt in which predetermined characteristics such as permeability, compressibility, and capillary structure, may be easily and economically controlled during manufacture in order to repeatably produce a uniform fabric.

It is another object of the present invention to provide a papermakers belt constructed entirely of nonwoven layers in a laminated construction.

These and other objects and advantages will become more apparent when reference is made to the following detailed description of a preferred embodiment and the drawings referred to therein.

BRIEF DESCRIPTION OF THE DRAWINGS

FIG. 1 is a perspective view of a section of papermakers fabric made according to the invention;

FIG. 2 is a cross-sectional view showing the detail of a drainage aperture along the section lines indicated in FIG. 1;

FIG. 3 is a cross-sectional view of a portion of a fabric illustrating variation in hole size among layers;

FIG. 4A is a perspective view of a section of fabric illustrating the placement of detergent between the layers comprising the fabric;

FIG. 4B is a perspective view of a section of a self-cleaning fabric which has detergent bubbles formed in the top layer;

FIG. 9 is a perspective view of section of a top layer embossed with a waved pattern form;

FIG. 10 is a perspective view of a section of a top layer embossed with a corrugated pattern;

FIG. 11 is a schematic illustration of a portion of the process whereby a fabric layer is embossed prior to lamination;

FIG. 12 is a partial schematic illustration of the staggered splicing of fabric layers; and FIG. 13 is a partial schematic illustration of the splicing configuration of a laminated fabric.

DETAILED DESCRIPTION OF THE DRAWINGS

Figure 5:
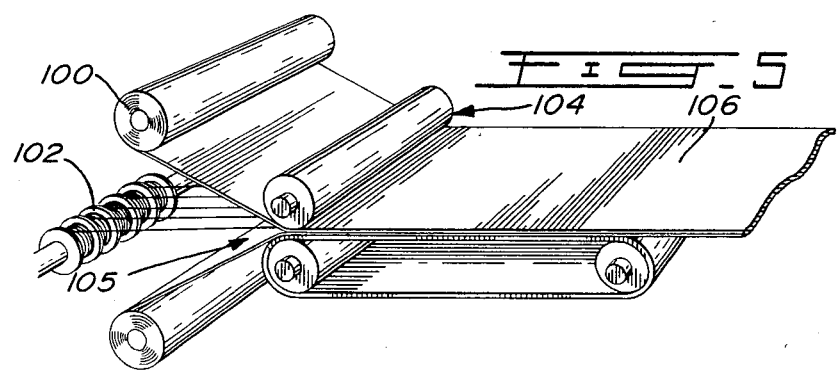
FIG. 5 is a partial schematic illustration used to explain the process whereby yarn is incorporated into the fabric.

With reference to FIGS. 1 and 2, a portion of a papermakers fabric embodying the techings of the subject invention is generally designated as 10. In the embodiment of FIG. 1, the fabric generally comprises a plurality of impervious nonwoven sheets 21 through 25 joined together in a laminated arrangement to define the fabric. Defined throughout the fabric are a series of drainage apertures 30 which are created in the fabric by conventional techniques, such as laser drilling.

With continued reference to FIG. 1, each layer 21 through 25 of the papermakers fabric serves a particular purpose. For example, if the laminated fabric is to be used as a forming fabric, then the layer 21, which will contact the paper slurry, should be made of a highly abrasion resistant material such as steel, polyamide, or polyurethane. The same is true of the layer 25 which contacts the dewatering screen during the initial paper formation process. The remaining layers 22 through 24 are chosen to provide the papermakers fabric with desirable characteristics important to its intended use. For example, one of the layers 22 through 24 might be a material exhibiting high tensile strength to add strength and rigidity to the fabric. Another layer might be acid resistant. In addition, another layer might be antistatic, to prevent static charge accummulation, a common occurrence in dryer fabrics.

Laminated layers having certain properties may be incorporated in a particular fabric to achieve performance results. By the selection of suitable materials a layer can be constructed which is: abrasion resistant; corrosion resistant; compressible; water absorbing; of high tensile strength; water rejecting (e.g. coated with paraffin); heat resistant; clean running or self cleaning; acid resistant; fluorescent (i.e., with increased heat transfer abilities); alcohol resistant; antistatic; or flame retardant. Materials which would provide many or all of these properties include: sheets of polyamide; steel; polyurethane; glass fiber; or polyvinylchoride; and non-woven webs of polyester; acrylic polyamide; or Nomex. Thus, it can be appreciated that, depending on the intended use, the number of layers and the materials constituting the layers may differ from fabric to fabric.

What does not differ, however, is the method by which the various layers are laminated together. Within the various sections of the papermaking machine, there exists a harsh environment, both in terms of heat and in terms of chemical reactions. Therefore, the various layers must be joined together in such a manner that they will remain unaffected by the environment when the fabric is placed in its position of intended use on the papermaking machine. For this reason, it is desirable to use such highly reliable techniques as ultrasonic welding to join the various layers together.

Ultrasonic welding is accomplished by heating the fabric in an ultrasonic field which causes the different layers of the fabric to weld together. Alternatively, the welding can be accomplished through the use of such conventional techniques as high-frequency welding or heated rolls. Other methods of joining the layers of the fabric include gluing with an appropriate heat-resistant, flexible material, or treating with chemicals, such as phenole or acrylic. These chemicals can also be used to provide reinforcement for the welding process.

For certain applications, it is desirable to produce the drainage apertures or holes after the various layers have been laminated together. For other applications, it is desirable to produce apertures of varying sizes, as shown on FIG. 3, in the individual layers and then to laminate the layers together so as to create capillary channels of varying size. The choice of hole size, shape, frequency and whether the hole is formed through the individual laminates or through the whole structure would depend upon the type of fabric required.

Holes of varying size are useful in wet felts and forming fabrics to allow adequate drainage, but at the same time must not allow the fibers forming the paper to pass through the holes. Thus, by having a high frequency of small holes formed in the surface laminate and a lower frequency of large holes formed on the lower layers, the water can be quickly and easily drained off. The small diameter top layer holes prevent fibers from being carried from the paper slurry by the action of the draining water. In the embodiment shown in FIG. 3, the paper receiving surface 42 has a first layer 51 with small closely-spaced apertures 44. In each succeeding layer, down to the machine roll contacting surface 46, the size of the apertures increases and the frequency of the apertures diminishes and each aperture in the layers overlaps at least one aperture in an adjacent layer so that, finally, in the machine roll contacting surface the apertures 48 are the largest and of last density on the surface of the layer.

As indicated above, such an arrangement is advantageous in wet felts and forming fabrics.

It is desirable to produce the various holes, be they in the fabric after lamination of the individual layers, or in the individual layers prior to lamination, by using a laser drilling technique. Such a technique permits absolute control of the size, form, and distribution of holes throughout the fabric. Because of the reliability of laser drilling, precise duplication of a fabric structure is possible.

Preventing the clogging of the drainage apertures and also maintaining the surface of a traditional papermakers fabric free of dirt is of paramount importance. The present invention lends itself to solving these problems. In particular, the paper contacting layer or another layer of the papermakers belt made according to the teachings of the present invention may be made self-cleaning by incorporating material such as powdered soap, nonionic detergent, or sulphonamid acid into the layer during the lamination process. Incorporation can be accomplished by means of spraying those materials, in liquid, gas, or preferably solid form, upon a layer during lamination. In addition, a self-cleaning layer may be incorporated within the fabric and bounded by other layers or may be deposited as a liquid or a powder between layers during construction of the fabric.

FIGS. 4A and 4B illustrate alternate embodiments of self-cleaning fabrics. FIG. 4A illustrates a section of fabric 120 which has a detergent layer 122 incorporated between the non-woven layers. This layer can be deposited during the lamination process by spraying a solid detergent on one of the layers to be laminated.

During the operation of the belt on a paper machine the detergent will act to clean the fabric in two basic ways. First the compression pressure of the various paper machine rolls will cause the detergent to permeate through the fabric and hence, to clean it. Second, the action of the water passing through the fabric will dissolve a portion of the detergent and allow it to permeate the fabric by capillary action through the drainage apertures.

FIG. 4B illustrates a second embodiment of a fabric section with self-cleaning properties. In this fabric section 128, the top fabric layer 129 has detergent bubbles or pockets 130 formed in its surface. These bubbles containing a solid or powdered detergent are formed in the single layer prior to lamination with the other layers. Each bubble 130 has a given amount of detergent which is slowly released as the surface of the fabric 129 is worn. As the detergent is released it performs the function of continuously cleaning the fabric.

For some applications, it is desirable to incorporate yarns between the layers of the fabric. Such yarns could be incorporated between the laminates in order to add strength, absorbency, anti-static properties, or even possibly as a means of carrying detergent. FIG. 5 illustrates one method of incorporating the yarns between the layers of the fabric. The final fabric 106 is formed at the laminating section 104 of the machine from separate rolls containing the individual fabric layers 100 and 101. Individual rolls of yarn 102 are disposed behind the paper machine and individual strands fed into the laminator nip 105 where they are incorporated with the non-woven layers as they are laminated together.

Figure 6A:
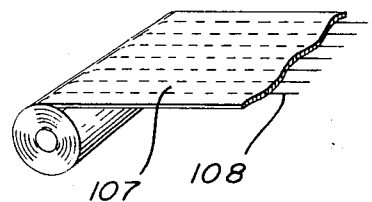
FIG. 6A is a perspective view of a roll of fabric layer material containing embedded fibers in the machine direction.
Figure 6B:
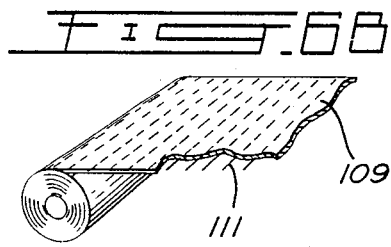
FIG. 6B is a perspective view of a roll of fabric layer material with embedded fibers in the cross machine direction.

An alternate method of production requires that the yarn be incorporated into an individual fabric layer prior to lamination with other layers. Such layers are illustrated FIGS. 6A and 6B. In FIG. 6A, fabric layer 107 is formed with yarns 108 embedded in the fabric in the machine direction; the fabric layer 109, illustrated in FIG. 6B, has yarn fibers disposed in the cross machine direction. The individual yarn containing fabric layers, formed as described above, are laminated with the remaining layers of the fabric in a standard fashion.

Figure 7:
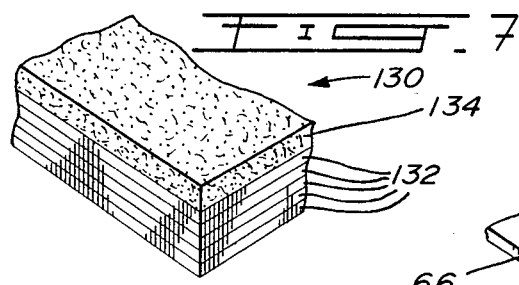
FIG. 7 is a perspective view of a section of wet press felt illustrating the use of laminated fabric in conjunction with traditional batt material.

Historically, the traditional batt material used in wet press felt applications has performed well in the function of transferring moisture out of the newly formed paper sheet. In order to obtain the improved wear, and strength properties which can be realized by the use of laminated wet press felts, traditional batt material may be incorporated as the uppermost layer of the laminated felt. As shown in FIG. 7, a section of wet press felt 130 is comprised of standard batt material 134 which is attached by resin or glue to the base fabric of laminated layers 132. In such a way, the advantages found in the traditional batt wet press are augmented by the advantages of strength and durability which results from the use of a laminated papermakers fabric.

Figure 8B:
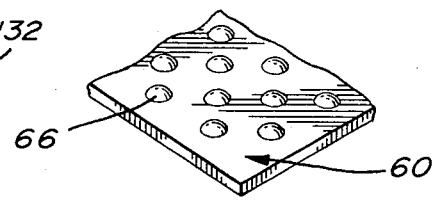
FIG. 8B is a perspective view showing a section of a fabric having an embossed top layer.
Figure 8A:
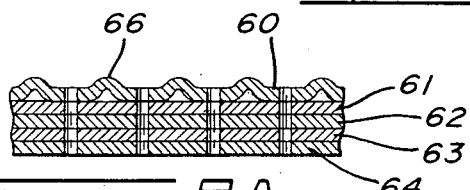
FIG. 8A is a cross-sectional view illustrating a section of fabric with a corrugated top layer.

With reference to FIG. 8A, the use of an embossed surface layer is illustrated. The top layer 60 contains a number of embossed areas 66 throughout the full length and width of the fabric layer. The top layer 60 can be created in different configurations depending upon the intended use of the fabric. For example, as shown in FIG. 8B, rounded embossed areas 66 can be evenly distributed across the top layer of the fabric 60. The embossed areas can have a rounded wavy cross-sectional appearance as shown in FIG. 9, or a corrugated appearance as shown in FIG. 10. Corrugation, including a plurality of sharp creases 67 in the fabric, will greatly increase the friction between the fabric and the guide rolls of the paper machine, thereby allowing improved guiding of the fabric along its path on the paper machine.

Embossing of the top fabric layer can be most readily accomplished prior to lamination by passing the intended surface layer between heated rolls having an appropriate pattern. To create the embossed layer a heated roll embossing section would be added prior to the point of laminating together the various fabric layers. FIG. 11 illustrates this operation, with a top fabric layer 74 being passed between a top heated roll 76 and a bottom heated roll 78 which have complementary shapes to form appropriate contours 79 in the fabric layer. In this way, by varying the height and surface area of the individual embossed areas, the frictional properties of the surface of the fabric may be altered. Roughening the top and/or the bottom surface of the fabric causes the friction between the rolls and belts to increase and therefore the response to the paper machine guiding equipment for controlling the movement of the fabric through the paper machine is improved. This is an even more important factor if the paper machine guiding equipment is not functioning properly. The fabric can be manufactured with given surface frictional properties to meet any type of guiding system.

With reference to FIG. 12, a section of typical fabric 10' embodying the teachings of the subject invention is composed of a number of layers 81 through 89 with each layer being spliced to itself to create an endless band. To construct the band illustrated in FIG. 12, the innermost layer 89 is secured to itself at the splice point 90. The next outermost layer 88 is laminated to the first layer and is also spliced to itself at point 91. However, the splice point 91 is staggered relative to spliced point 90 of the first layer so as not to adversely affect the overall thickness of the belt through the creation of a bulge caused by the buildup of spliced areas one above the other. A bulge, if allowed to be created, would require the outer layers to be longer so as to cover the bulge, a situation which is undesirable.

Splices to replace a section of the fabric are made by cutting out a section and replacing it with a new section of fabric, which is joined to the old fabric using glue, welding, or other techniques described above for joining the fabric. As illustrated in FIG. 13, splices 110 are made in the fabric at an angle 112 of 15° to 45° from a line perpendicular to the machine direction. By splicing the fabric at an angle to the cross machine direction, machine direction tensions are spread along the longer splice line. In addition, as described above, each layer is spliced at a different point vertically through the fabric. By offsetting the splices of each layer, there will be no build up in the joined area overall, so that any slight increase in thickness will be spread over a large area.

Apart from its seam, each of the layers is a unitary structure, resulting in a high precision and highly repeatable fabric product. Repeatability is accomplished because each layer in the fabric is an individual unit. Overall, therefore, the repeatability from one product to the next is uniform, whereas in a woven textile fabric, differences occur due to variations in the spinning process for making the yarns, the weaving process and the heat stabilizing process. While these variations are small, they do detract from accurate reproducability. Products made according to the above disclosure have the advantage of minimizing the variations, therefore resulting in a highly reproducible product.

Although the present invention has been shown and described in terms of a specific preferred embodiment, it will be appreciated by those skilled in the art that changes or modifications are possible which do not depart from the inventive concepts described and taught herein. Such changes and modifications are deemed to fall within the purview of these inventive concepts.

What is claimed is:

1. A papermakers belt comprising:
    a plurality of sheets of impervious non-woven material arranged as layers one on top of the other and joined together by lamination to provide a multi-layered fabric having a topmost layer, an intermediate layer and a bottommost layer, said sheets being joined together at their ends to form an endless belt, each of said sheets having a plurality of drainage apertures that extend through the respective sheets, wherein each aperture in the layers overlaps at least one aperture in an adjacent layer to define continuous passageways for fluid to pass through said multilayered fabric from said topmost layer to said bottommost layer and being constructed of a material so that the sheet possesses an attribute required by the papermakers belt for its intended use, said drainage apertures formed in the topmost layer of said belt being of a size so that paper slurry fibers will not readily pass therethrough, and wherein said drainage apertures formed in each successive layer from said topmost layer are larger than those apertures in the previous layer to impart a desired permeability to the fabric.

2. A papermakers belt as recited in claim 1, wherein the topmost layer has an embossed patterned outer surface.

3. A papermakers belt as recited in claim 1, wherein the topmost layer and the bottommost layer each have greater abrasion resistance than said intermediate layer.

4. A papermakers belt as recited in claim 1 further comprising an outer layer of batt material joined to the topmost non-woven layer.

5. A papermakers belt as recited in claim 1 wherein the ends of each layer are secured to each other to define a splice; and wherein said splices are staggered relative to and along the belt.

6. A papermakers belt as recited in claim 5, wherein said endless belt has a machine direction along its length and a perpendicular cross machine direction, and wherein said splices are formed at an acute angle to the cross machine direction.

7. A papermakers belt as recited in claim 6, wherein said angle is between 15° and 45°.

8. A papermakers belt as recited in claim 1 wherein said sheets are joined at their ends to form an endless belt; and wherein a plurality of yarns are interposed between at least one pair of adjacent layers.

9. A papermakers belt as recited in claim 1 wherein said sheets are joined at their ends to form an endless belt; and wherein a plurality of yarns are incorporated within at least one of said layers.

10. A papermakers belt as recited in claim 9, wherein said belt has a predetermined width and said plurality of yarns are oriented perpendicular to the width of said belt.

11. A papermakers belt as recited in claim 9, wherein said belt has a predetermined width and said plurality of yarns are oriented along the width of said belt.

12. A papermakers belt in accordance with claim 1, including means for self-cleaning the fabric incorporated into the fabric structure, said means for self-cleaning comprising a cleaning material placed between said layers.

13. A papermakers belt as recited in claim 12, wherein said means for self-cleaning comprises a cleaning material incorporated within at least one of said layers.

* * * * *